C. K. HARDING.
PROCESS AND APPARATUS FOR PRODUCING LIGHT FROM HYDROCARBONS.
APPLICATION FILED MAY 9, 1910.
969,368.
Patented Sept. 6, 1910.
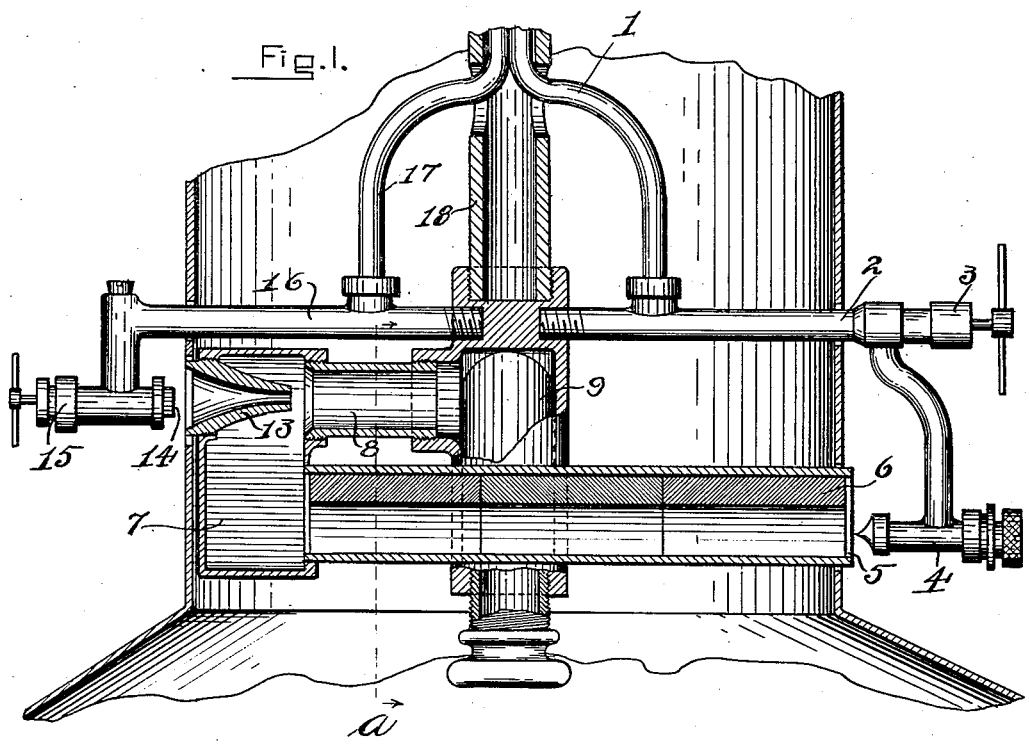
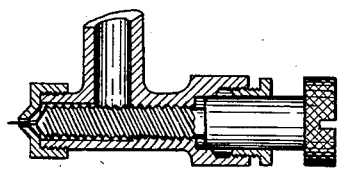
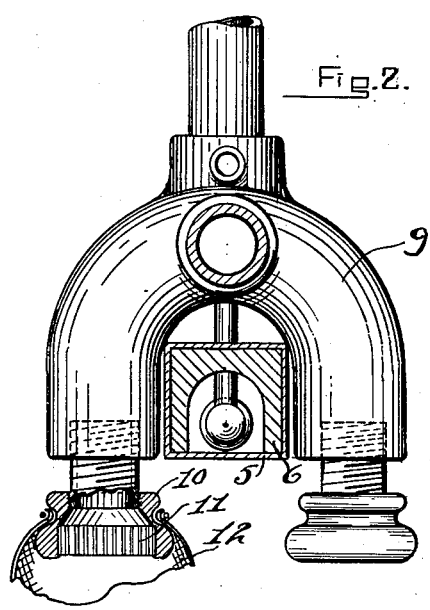
Witnesses.
R. T. Satterthwaite.
John D. Parker.
Inventor.
Charles Knox Harding.

UNITED STATES PATENT OFFICE.

CHARLES KNOX HARDING, OF CHICAGO, ILLINOIS.

PROCESS AND APPARATUS FOR PRODUCING LIGHT FROM HYDROCARBONS.

969,368.  Specification of Letters Patent.  Patented Sept. 6, 1910.

Application filed May 9, 1910. Serial No. 560,282.

*To all whom it may concern:*

Be it known that I, CHARLES KNOX HARDING, a citizen of the United States, residing at Woodlawn, Chicago, in the county of Cook, in the State of Illinois, have invented certain new and useful Improvements in Processes and Apparatus for Producing Light from Hydrocarbons, of which the following is a specification.

One of the principal objects of my invention is to produce an efficient light from heavy hydrocarbons in such a manner that it can be operated for long periods of time without liability of deposits of tarry or solid matter being formed to prevent or interfere with its continuous use.

According to this invention, liquid hydrocarbon, especially a liquid mixture of hydrocarbons having different boiling-points, such as kerosene, is pulverized and delivered in the form of a finely divided spray or mist, mixed with a quantity of atmospheric air in motion. The mixture is passed through highly heated channels in which most of the necessary heat is applied to form a perfectly combustible gaseous mixture after the liquid has escaped from the pressure at the point of delivery, as distinguished from the general practice heretofore in hydrocarbon incandescent lighting, in which the heat was applied to the liquid in an inclosed generating chamber in which the fluid was vaporized, expanded and superheated, so that the large volume of vapor could issue at a high velocity and entrain sufficient air at atmospheric temperature to form a suitable mixture without further heating.

In my U. S. Patent Number 803,534, Oct. 31, 1905, I described a system, in which most of the heat required for the air and to raise the heavy hydrocarbon vapor to the temperature necessary to form a perfectly combustible gaseous mixture, was supplied by the action of a catalytic substance, and the heat was communicated to the mixture after the vapor at a comparatively low temperature, had been given off from the vaporizing surface, and mixed with a portion of the air required. In my present invention, I may employ catalytic action in part to act on the mixture and produce some of the heat, but I prefer to utilize to a great extent, the surplus heat generated by the burner, in incandescing the mantle for heating the channels of the heating tube through which the mixture of oil and air is passed.

In the accompanying drawings, which show one form of apparatus embodying my invention, I have illustrated the use of a supplementary source of energy in the form of a fine stream or jet of rapidly moving air or other elastic gas supplied to the light producing device through a small tubular wire connecting to any suitable auxiliary source of supply of an elastic fluid, which is gaseous at atmospheric temperature, and under considerable pressure, say one to three atmospheres.

My invention is therefore characterized by avoiding the fractional distillation of the liquid under pressure and the accumulation of less volatile deposits at the point where the liquid evaporates, and by subjecting the mixture to any desired high temperature necessary to gasify hydrocarbons of high boiling point and by delivering the combustible mixture through the burner to the mantle at any suitable high velocity to produce intensive action and the greatest lighting efficiency of the mantle.

In the drawings, Figure 1 is a sectional elevation through a lamp showing the Bunsen tubes air inducing, heating and mixing passages in section and the liquid oil and compressed elastic gas feed pipe are illustrated in full view. Fig. 2 is a view at right angles from the section line (*a*) in Fig. 1, showing the U shaped member 9 to which the inverted burners and mantles are attached and an end section of the primary Bunsen and heating tube showing an arch like section of the catalytic material 6 comprising a portion of the walls of the tube, which is hereinafter referred to as a heater tube while it combines the functions of a Bunsen tube in conveying and mixing the oil spray and air and also acts as a retort by subjecting its contents to heat treatment. The catalytic substance may be in the form of blocks, forming part of the inner lining of the tube and composed of any light porous refractory material platinized or containing any desired catalytic material, temperatures as high as 1,800 F. may readily be attained, but care should be taken not to ignite the mixture, though it is usually preferred to heat a mixture having much less air at this stage than is required for its complete combustion. The temperature communicated to the tube from the burners and mantle is sometimes sufficient to keep the lamp in operation so that an extremely small per cent. of the fuel value is used by the heater tube. In Fig. 3 of the drawings is shown a detailed view of the centrifugal spray nozzle 4 illustrating the manner in which the liquid is given a very rapid rotary motion as it escapes from the jet and causes it to spray or atomize the liquid and also mix the particles with some of the necessary air.

In operation the oil under sufficient pressure enters through the hollow tube 1 passes laterally through the horizontal arm 2, to the controlling valve 3 and then to the spraying nozzle 4 which projects a jet of the divided liquid into the end of the Bunsen heater tube 5 which passes through the opening of the U tube 9 between the depending portions which carry the burner and is subjected to the heating action of the burners and mantles. The mixture after passing through tube 5 enters the chamber 7 which also connects with the horizontal tube 8 which communicates with the interior of the U shaped passages in 9 and thence to the burner 10 and through the perforation of the gauze 11 after which it is burned largely in contact with the incandescent mantle a portion of which is shown at 12 the chamber 7 also carries a frusto-conical injector tube 13 directed along the central axis of the tube 8 which forms a supplementary air injector and produces a suction which helps draw the air through the heater tube. As it is preferable not to heat all of the air in the heater tube, but to deliver the mixture to the burners at a temperature not too high and the supplementary air taken in by the injector tube 13 it is thus useful in maintaining the proper temperature of the mixture.

The injector jet 14 is controlled by the valve 15 and communicates through the horizontal arm 16 with the hollow tube 17 which is led up through the lamp supporting tube 18 to the ceiling and thence to a suitable source of compressed gas or air.

If a combustible gas as natural or artificial illuminating gas, is employed as an auxiliary source of energy the relatively small quantity as little as one per cent. of the whole volume of combustible mixture, may be supplied by simple and automatically actuated devices from any convenient source of power or highly compressed or liquified gases in strong cylinders may be conveyed to the place of use. In such cases the light is started up and brought into use in a simple and convenient manner. The gas valve 15 is turned on and the mixture lighted at the burner. There will not be enough flame to properly light the mantle, but in a short time the tube will be hot enough to turn on the oil and then the generation of the combustible mixture will continue without further interruption. If compressed air is employed as an auxiliary source of power, to draw into and propel the combustible mixture through the heating passages and the burner gauzes to the mantles it would be necessary to first heat the tube 5 before bringing the lamp into proper action, this may be done in various ways, as by applying an alcohol torch to the exterior of the heater tube 5 near the nozzle 4 or the air and the oil spray may be ignited and burned inside the tube in contact with the catalytic lining which will quickly raise the temperature to a point so that when the oil supply has been turned off and the flame extinguished the supply may be reëstablished and the heat remaining will be sufficient to bring the lamp up to its proper action when the mantles are lighted.

It will be understood that the principal function of the auxiliary air or gas supply and which is one of the important elements of this invention is to furnish motive power to move and mix the hydrocarbon and air mixture in the absence of highly heated hydrocarbon vapor under pressure produced by its own vapor tension.

It is now known that many liquid hydrocarbons and distillation vapors assume a volatile or gaseous form, under a higher pressure or at a lower temperature, when mixed with a considerable quantity of another gas or vapor having a much lower boiling point than they would if unmixed with such lighter gas. I have also discovered that petroleum hydrocarbons break up or crack at a lower temperature when mixed with air or other more permanently gaseous substance and that the gaseous products, so produced have a higher molecular weight and higher boiling point.

In the apparatus illustrated, both the auxiliary gas supply and the liquid fuel are brought into the lamp from the top and in metallic contact with some of the hot parts of the burner and the ascending heated products of combustion, so that they both receive a certain amount of heating. It is obvious that the compressed elastic fluid could easily be supplied with a considerable amount of heat, and its volume correspondingly increased. For instance, it might have its absolute temperature almost doubled after it reaches the lamp, which would nearly double the volume, and the velocity of the escaping jet increased about forty per cent., but the total kinetic energy of the jet would be decreased about 30 per cent., if the area of the jet orifice were not adjusted. Where combustible compressed gas is used as auxiliary motive power this superheating may be employed to great advantage, automatically applying an increased flow in starting a cold lamp and conserving the supply when the lamp is in proper action. The oil may without any disadvantage, be heated to as high a temperature as it will stand under whatever pressure it is delivered to the burner, without vaporizing, but the liquid must not, in practice, be raised above the boiling point of its most volatile constituents at the pressure it is under at the time, but may, to advantage, be heated under pressure to such a temperature that on escaping from the pressure at the nozzle the more volatile portions of the liquid will readily vaporize and a part of their latent heat of vaporization may be derived from the other heavier hydrocarbon constituents of the mixture. It will be observed that the fine particles of oil escaping from the jet are at once subjected to heating action of the heater tube, by the conjunction of the two parts, and act on the particles, vapor and air, in motion, before they have lost their momentum, and convert the mixture into gaseous form while in motion.

Having now described my invention, and illustrated one method of carrying out the same, what I claim is:

1. In an apparatus for producing light from liquid hydrocarbon, an injector for producing a current of air in communication with a source of elastic fluid under pressure; a spraying device for atomizing the liquid hydrocarbon and mixing the atomized hydrocarbon with the flowing air, a heater tube through which the mixture is passed and in which it is subjected to high temperature, and a burner in which the mixture is burned in contact with an incandescent mantle, said burner and mantle being located adjacent to and in heating relation to said heater tube and adapted to heat the same by the combustion of the gas in said burner and mantle.

2. An apparatus for producing light from liquid hydrocarbon, comprising an ejector, in communication with a source of elastic fluid under pressure for imparting motion to a current of air, means for producing finely divided hydrocarbon and mixing the hydrocarbon with the air, a heater-tube through which the mixture of hydrocarbon and air is passed, and in which the mixture is subjected to a high temperature, a burner and an incandescent-mantle, located in close proximity and heating relation to said heater-tube, whereby the combustion of the mixture communicates heat to said heater-tube.

3. An apparatus for producing light from kerosene, comprising an injector for producing a flow of air, said injector being in communication with a source of supply of an elastic fluid under pressure, means for mixing the kerosene with the flowing air, a heater-tube through which the mixture of kerosene and air is passed and in which it is subjected to a high temperature, and a burner and incandescent structure in close proximity to said heater-tube whereby the said heater-tube is heated by the surplus heat incident to the production of light by incandescence.

4. An apparatus for producing light from liquid hydrocarbons, comprising an injector in communication with a source of supply of an elastic combustible fluid under pressure for producing a flow of atmospheric air, means for mixing finely divided hydrocarbon with the flowing air, a heater-tube through which the mixture of oil and gas is passed, and a burner and incandescent mantle located in close proximity to and in heating relation with said heater-tube whereby the combustion of the gaseous mixture in incandescing the mantle communicates heat to said heater-tube.

5. The process of producing light from liquid hydrocarbon which consists of producing a flowing current of atmospheric air by means of an escaping jet of air communicating with a suitable source of supply of said air under pressure, mixing the hydrocarbon with the flowing air, passing the mixture through a heater-tube, and subjecting it to a high temperature to produce a combustible gaseous mixture, and subsequently burning the mixture in a burner in contact with an incandescent mantle and in close heating relation to said heater-tube, whereby the said heater-tube is heated by the combustion of the gas burned for the production of light.

6. The process of producing light from liquid kerosene which consists of causing a current of air to flow by means of an escaping jet of an elastic compressible gaseous fluid communicating with a suitable auxiliary source of supply of said elastic fluid under pressure, mixing finely divided kerosene into the current of flowing air, passing the mixture of air and kerosene through a heater-tube and burning the mixture in contact with an incandescent structure adjacent to and in heating relation to said heater-tube, thereby heating said heater-tube by the heat produced incident to the production of light.

7. The process of producing light from liquid kerosene, in which a current of air is caused to flow by an injector, communicating with a source of supply of an elastic gaseous combustible fluid under pressure, mixing a finely divided spray of kerosene with the flowing air, passing the mixture through a highly heated heater-tube, and subsequently burning the gaseous hydrocarbons mixed with air in a burner and incandescent mantle, located near to said heater-tube, and thereby heating said heater-tube by some of the heat produced in incandescing the mantle.

8. In an apparatus for producing light from liquid hydrocarbon, an injector for producing a current of air in communication with a source of elastic fluid under pressure; a spraying device for atomizing liquid hydrocarbon and mixing the finely divided hydrocarbon with the flowing air, a heater tube through which the mixture is passed and a catalytic body in position to act on the mixture and a burner in which the mixture is burned in contact with an incandescent mantle.

9. An apparatus for producing light from kerosene, comprising an injector in communication with a source of elastic fluid under pressure for imparting motion to a current of air, means for mixing finely divided kerosene with the current of air, and a catalytic body in position to act by contact on the mixture of oil and air, and a burner for producing light.

10. An apparatus for producing light from liquid hydrocarbons, comprising an injector in communication with a source of supply of an elastic combustible fluid under pressure for producing a flow of atmospheric air means for mixing finely divided hydrocarbon with the flowing air a catalytic body in position to act on the mixture and a burner in which the combustible mixture is burned in contact with an incandescent mantle.

11. The process of producing light from liquid hydrocarbons, which consists of producing a flowing current of air by means of an escaping jet of elastic fluid communicating with a suitable source of supply of said elastic fluid under pressure, mixing the liquid hydrocarbons with the flowing air, passing the mixture in contact with a catalytic agent without effecting ignition, and subsequently burning the mixture in a burner for the production of light.

12. The process of producing light from liquid kerosene, which consists of causing a current of air to flow by means of an escaping jet of a combustible elastic fluid communicating with a suitable source of supply of said elastic fluid under pressure, mixing the kerosene with the flowing air and passing the mixture of air and kerosene in contact with a catalytic agent, thereby heating said catalytic agent and the mixture of hydrocarbons and air to form a combustible gaseous mixture and subsequently burning the mixture in a burner in contact with an incandescent mantle for the production of light.

13. The process of producing light from liquid hydrocarbons, which consists in causing a current of air to flow by an injector communicating with a source of supply of an elastic fluid under pressure, mixing finely divided oil with the flowing air, passing the mixture in contact with a catalytic agent and subsequently burning the combustible mixture as set forth.

In witness whereof I have hereunto set my hand this 7th day of May, A. D. 1910, in the presence of two witnesses.

CHARLES KNOX HARDING.

Witnesses:
  NANETTA L. MCCALL,
  JERRY E. WINHOLTZ.